United States Patent [19]

McBride, Jr. et al.

[11] 3,868,620
[45] Feb. 25, 1975

[54] LEVEL SENSOR AND METHOD OF MAKING THE SAME

[75] Inventors: Lyle E. McBride, Jr., Norton; William W. Bowman, North Easton, both of Mass.; Hans A. Stoeckler, Woonsocket, R.I.; Harold A. Hanson, Pawtucket, R.I.; Joseph J. Gibola, Cumberland, R.I.

[73] Assignee: Texas Instruments Incorporated, Dallas, Tex.

[22] Filed: Dec. 20, 1973

[21] Appl. No.: 426,872

[52] U.S. Cl............ 338/28, 29/612, 29/613, 338/22
[51] Int. Cl............................................. H01c 7/00
[58] Field of Search ............. 338/22, 25, 28, 229; 29/610, 612, 613, 614; 73/362 AR; 340/244 R

[56] References Cited
UNITED STATES PATENTS

| | | | |
|---|---|---|---|
| 2,422,925 | 6/1947 | Rady et al. | 338/28 X |
| 2,611,007 | 9/1952 | Cade et al. | 338/229 X |
| 2,753,714 | 7/1956 | Perkins et al. | 338/229 X |
| 2,933,708 | 4/1960 | Elliot et al. | 338/28 |
| 3,375,774 | 4/1968 | Fujimura et al. | 338/22 R X |

Primary Examiner—C. L. Albritton
Attorney, Agent, or Firm—Harold Levine; John A. Haug; James P. McAndrews

[57] ABSTRACT

A hermetically sealed package provided with a PTC sensor pill which is usuable in an electric circuit to signal a sensed fluid condition. The sensor is provided with a high and a low heat flow path from the sensor pill to the ambient.

19 Claims, 5 Drawing Figures

3,868,620

PATENTED FEB 25 1975

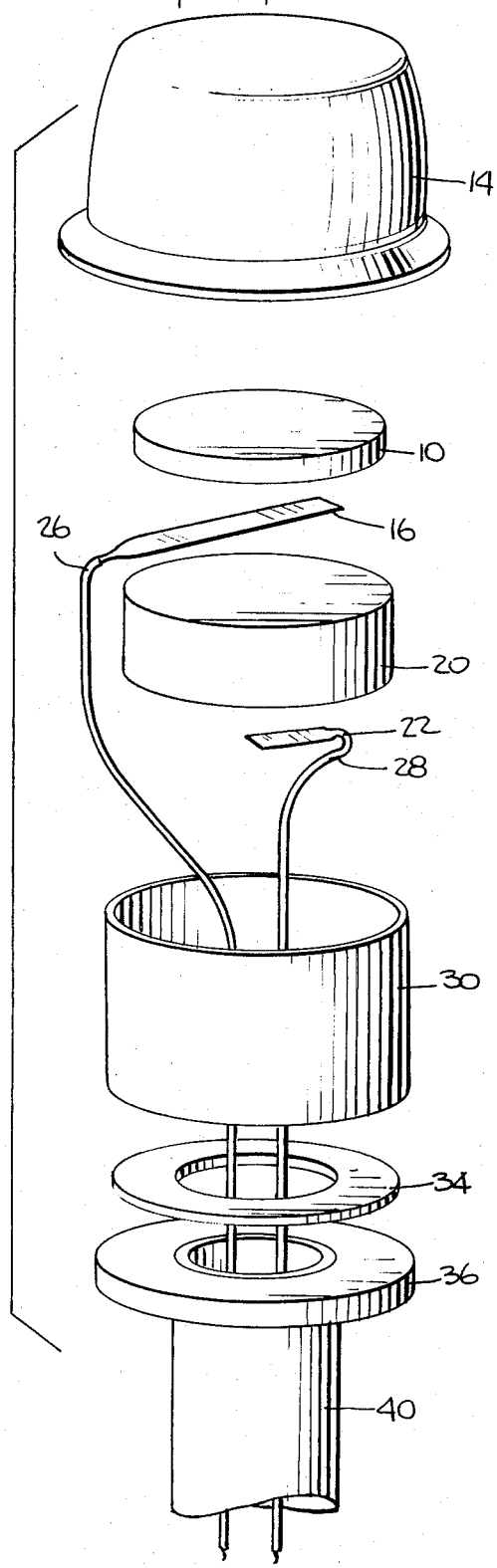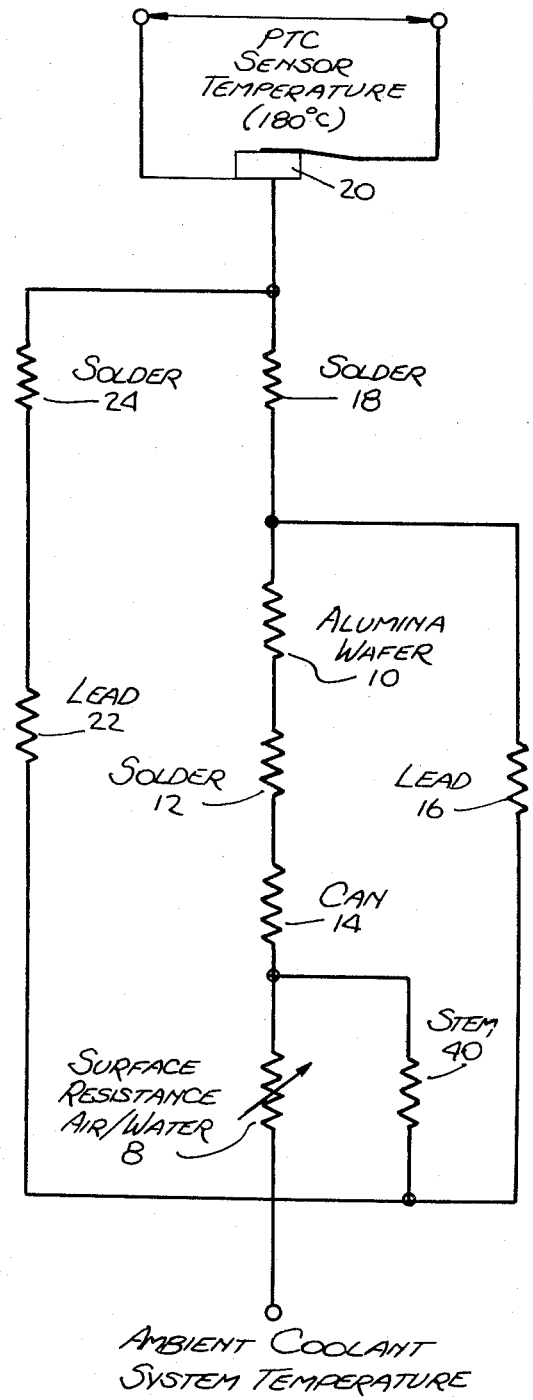

LEVEL SENSOR AND METHOD OF MAKING THE SAME

BACKGROUND OF THE INVENTION

1. Field of the Invention

This invention relates to a sensor for determining the presence or absence of a liquid in a system and to the method of making the sensor. Particularly it relates to an electrically powered level sensor for the liquid coolant system of an internal combustion engine and to the method of making such a sensor which operates in a low resistance mode when immersed in one medium and in a high resistance mode when immersed in another medium.

2. Description of the Prior Art

Various devices have been employed in the past to indicate the liquid level in a given system. These include, for example, mechanical floats, NTC thermistors, pressure-sensors, light reflecting mechanisms and fluids having electrical conductivity. In response to the recent increased emphasis in providing safety features for consumer products, particularly automobiles, one Leo Marcoux pointed out the deficiencies of these prior techniques while disclosing a level sensor which used the characteristics of a PTC sensing element as part of an electrical circuit to determine and indicate when the brake fluid level in an automobile braking system was below a predetermined safe level. Refer to U.S. Pat. No. 3,760,352. Marcoux's sensor operated in a low resistance mode so long as the liquid level remained above the sensor element permitting heat generated in the element to dissipate. However, if the liquid level receded sufficiently to expose the sensor element, the sensor heated up until it reached an anomaly temperature beyond which its resistance became very high permitting a switch to operate a signal lamp. Marcoux stated that his liquid level sensing apparatus can be used with liquids other than brake fluids. See also, U.S. Pat. No. 3,766,395.

The present invention is an improvement of the level sensors disclosed in the prior art. While useful for the purposes for which they were intended, the prior art sensors did not contemplate the stringent specifications required of a level sensor for the liquid coolant system of a modern internal combustion engine. The PTC sensor element of the prior art, while coated with a protective material, was exposed to the liquid coolant and was attacked by modern antifreezes. Further, the prior art PTC sensor was not elelctrically isolated from the liquid coolant and was affected by vibrations. The aforesaid deficiencies reduced its efficiency and caused frequent failures.

The present invention overcomes the shortcomings of the prior art by providing an overall package which rapidly dissipates heat in water and quickly self-heats in air while being hermeticallay sealed, electrically isolated from the liquid and resistant to vibration damage.

SUMMARY OF THE INVENTION

The invention is a combination level sensor, and the method of assembly, having an inner package and an outer package hermetically sealed and adapted for connection to an electrical circuit. The inner package includes an open-ended, bulbous-shaped housing within which is soldered an assembly comprising a wafer-shaped electrical isolator soldered to the housing and two wire leads which are soldered to oppositive sides of a properly contacted temperature sensor pill, the sensor pill being soldered to the wafer sandwiching a flattened end of one lead therebetween. The sensor pill has a low electrical resistance mode and a high electrical resistance mode, the switchover between the two modes occurring at a temperature above a predetermined anomaly temperature. A side insulating sleeve and rear insulating washer surround the wafer, sensor and lead ends. 95 percent tin/5 percent silver solder is used in the inner package. The outer package covers and hermetically seals the open end of the housing, the leads extending therethrough and having electrical connectors secured to the outer ends thereof. When the level sensor is immersed in water, its self heat becomes less than when in air and operates in the low resistance mode. When the sensor is exposed to air, it increases its self-heating, due to the electrical current therethrough, to a temperature above the anomaly temperature and operates in the high resistance mode.

The outer package includes a metal covering washer, the periphery of which is soldered to the open end of the housing, a hollow, stainless-steel stem silver-soldered to the covering washer, a bushing silver soldered to the stem, the wire leads extending through the washers, stem and bushing, and the opening of the bushing being filled with an insulating epoxy compound.

The sensor is assembled by first soldering one wire lead to one side of the sensor pill and then soldering the other side of the sensor pill to an electrically isolating wafer while sandwiching the flattened end of the second wire lead therebetween. The wires are each covered with an insulating sleeve and the assembly is placed within a bulbous-shaped can open on one end into which has been first placed a solder form, the alumina wafer being placed adjacent to the solder form. Heat is applied to the can to melt the solder form, adhering the alumina wafer to the can. The open end of the can is sealingly closed by securing the cover to the can. The cover is preformed by soldering the covering washer and bushing to opposite ends of the hollow cylindrical stainless steel stem and then soldering the periphery of the washer portion to the open end of the can. The open end of the bushing is filled with an insulating compound. The leads pass through a central opening in the cover and extend through the insulating compound and beyond the end of the bushing. The compound is cured while holding the leads against movement.

Accordingly the objects of the present invention are to provide:

1. A liquid level sensing device which has good thermal resistance properties and dissipates heat rapidly in liquid but slowly in air.
2. A liquid level sensing device which has a low time constant and heats up rapidly after the liquid level recedes to expose the sensor to air.
3. A liquid level sensing device which is hermetically sealed, separating the sensing elements from the liquid.
4. A liquid level sensing device in which the sensing element is electrically isolated from the liquid.
5. A liquid level sensing device which is resistant to vibration damage and thermal fatigue.
6. A liquid level sensing device in which none of the component materials attacks the sensing element and none is attacked by the liquid particularly internal combustion engine liquid coolants containing antifreeze.

Further objects are disclosed in the description of the drawings and preferred embodiment set forth below.

DESCRIPTION OF THE DRAWINGS

FIG. 4 is an exploded oblique view of the elements shown in FIG. 2.

FIG. 5 is a heat flow distribution chart for the entire level sensor package showing schematically the thermal resistances of the several heat paths.

DESCRIPTION OF THE PREFERRED EMBODIMENT

Figure 1:
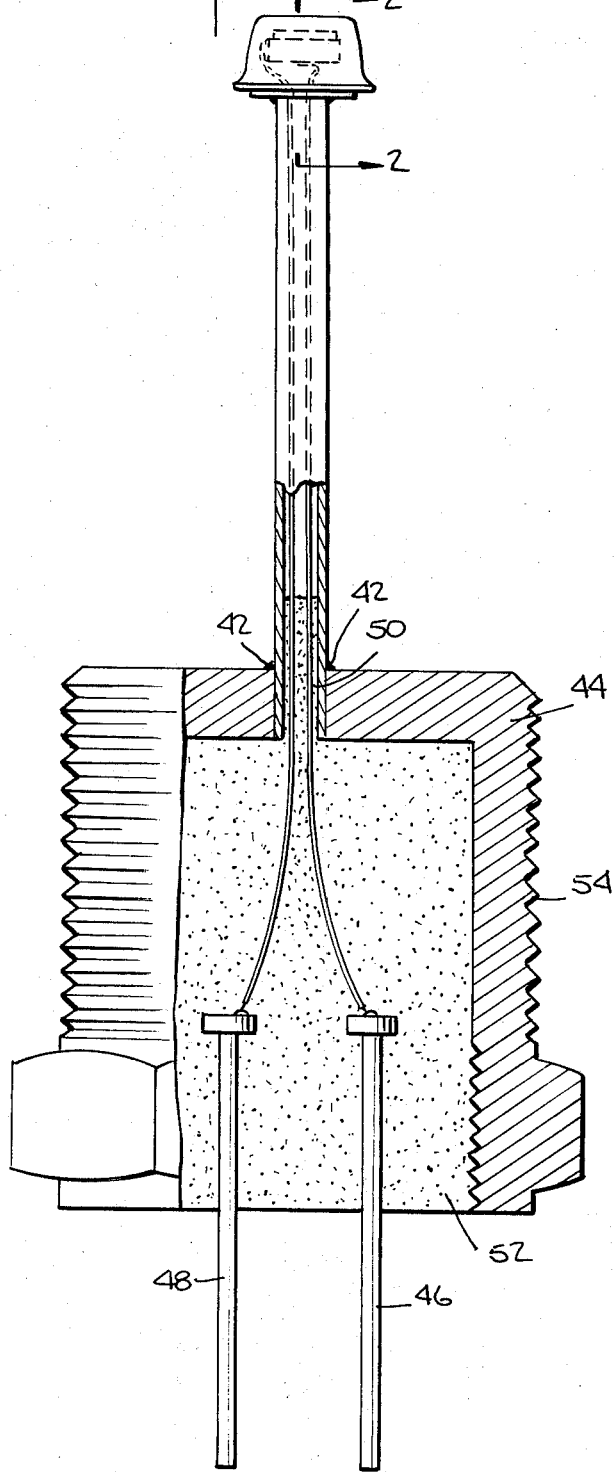
FIG. 1 is an elevation view in partial section showing the overall configuration of the level sensor of the present invention.
Figure 2:
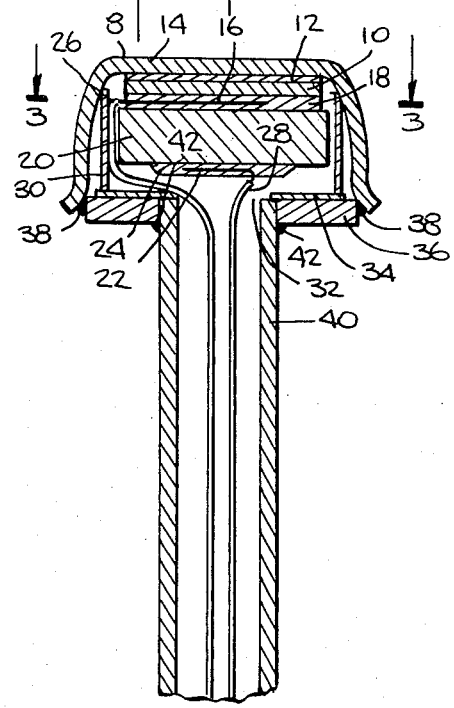
FIG. 2 is an enlarged sectional view along the lines 2—2 of FIG. 1 showing the bulbous can and the arrangement of the sensor elements therein.
Figure 3:
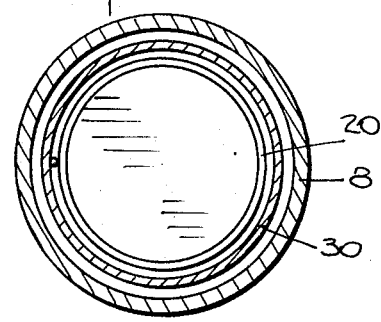
FIG. 3 is a sectional view along the lines 3-3 of FIG. 2.

Referring to FIGS. 1–4, there is shown the level sensor of the present invention. An alumina wafer 10 is soldered 12 to the inside of bulbous-shaped can lid 14. A flattened cupron wire lead 16 is buried in a tin-silver solder layer 18 conjoining a solderable surface of a properly contacted PTC sensor 20 to the alumina wafer 10. In this regard, such a properly contacted PTC sensor is shown in a commonly assigned, application for United States patent, Ser. No. 361,705 filed May 18, 1973 entitled "Ohmic Contact For Ceramic Material" wherein opposite outer surfaces of the contacted sensor are formed of solderable metal. Another flattened cupron lead 22 is soldered (Sn/Ag) 24 to the other solderable surface of the PTC sensor 20. Both leads are covered with insulating sleeves 26, 28. A cylindrical kapton sleeve 30 insulates the side walls of the can 14. Both leads are passed through the central opening 32 of a kapton washer 34 and a kovar washer 36 which close the open end of the can 14. The kovar washer 36 is soldered with tin-silver solder 38 to the end of the can 14. Stainless steel stem 40 is silver soldered as at 42 to the kovar washer 36 at one end and is 95/5 tin/silver, or preferably silver, soldered to the bushing 44 at the other end. Two pins 46 and 48 are connected to the ends of the two wire leads 16 and 22. The end of the stem is filled with a sealant 50 and then the open end of the hex nut is filled with potting compound 52 hermetically sealing the sensor and insulating the wires and connectors from each other. Bushing 44 is adapted 54 for mounting to a system containing a liquid the level of which is to be indicated as safe or not.

The level sensor of the present invention is really a two mode resistor connected in an electrical circuit. When power is applied to the sensor pill of the level sensor, it presents a certain resistance to the current and begins to self-heat. In the low resistance mode the level sensor dissipates a large amount of heat. In the high resistance mode, the level sensor is at a higher temperature and dissipates a lesser current of heat. The low resistance mode corresponds to a condition when the level sensor is surrounded by liquid coolant, a safe liquid level condition. The high electrical resistance mode corresponds to a condition when the level sensor is surrounded by air, an unsafe liquid level condition. The high resistance indicative of the latter condition is sensed by the electrical circuit and operates a switch to turn on an appropriate alarm or to initiate shut down action or other appropriate action.

The above applies when the sensing element has a positive temperature coefficient (PTC) which causes the electrical resistance of the sensor to increase greatly at temperatures above a certain anomaly temperature. The reverse would apply for a sensing element which has a negative temperature coefficient (NTC). Either type sensor can be used in the present invention because both type sensors are temperature sensitive and switch from one electrical resistance mode to the other electrical resistance mode at temperatures above a predetermined temperature.

The present invention is designed to selectively dissipate the heat generated within the sensing element by the electrical current flowing through it by taking advantage of the great disparity between the surface heat transfer coefficients of water and air in order to operate the electrical switch described above while sealing the sensing elements from the liquid.

The design characteristics of the invention are governed by the principles of thermodynamics discussed below.

Theoretically interposed between the sensing element (which can be electrically heated to over 180°C.) and the ambient (liquid or air) which under ambient conditions may be anywhere in the approximate range −40°C. to 104°C. is the thermal resistance of the materials of which the overall sensor package is made. That thermal resistance of the overall package, most importantly, varies as a function of the thermal resistance of the surface exposed to the ambient. The thermal resistance of the surface varies significantly with whether the medium to which it is exposed is air or liquid.

Stated in the form of equations: $T_{PTC} = Q_{PTC} R_{OVERALL} + T_{AMBIENT}$ $Q_2 = \Delta T \cdot A \cdot h_c$ or $\Delta T/Q_2 = 1/Ah_c = R_{SURFACE}$ $R = L/A\sigma$ (3)

In the first equation the temperature of the PTC sensor ($T_{PTC}$) (which ultimately determines its elelctrical resistance) equals the amount of heat electrically supplied to the PTC sensor ($Q_{PTC}$) times the thermal resistance of the overall sensor package ($R_{OVERALL}$) (which varies significantly for air and liquid) plus the ambient temperature ($T_{AMBIENT}$). For the sensor to operate satisfactorily for an internal combustion engine, for example, the sensor must function at ambient temperatures of −40°C. to 104°C. Furthermore, at no point must there be an overlap in $T_{PTC}$ for air or liquid, otherwise, the sensor could not distinguish between them. Thus, in the first equation $Q_{PTC} R_{OVERALL}$ preferably should be very large in comparison to $T_{AMBIENT}$ to render de minimus the effect of $T_{AMBIENT}$. Furthermore, $R_{OVERALL}$ when immersed in air should preferably be very large and not overlapping in relation to $R_{OVERALL}$ when immersed in liquid for the entire range of ambient temperatures likely to be encountered. Thus, ideally, the $T_{PTC}$ in a well constructed, electrically heated sensor, should preferably be directly related primarily to the thermal resistance of the overall sensor package ($R_{OVERALL}$).

The second equation defines the principle by which one evaluates the rate at which various materials transfer heat from one medium to another. The amount of heat transferred from a solid surface to a fluid ($Q_2$) equals the temperature difference between the surface and the fluid ($\Delta T$) times the area of the surface (A) times the surface heat transfer coefficient ($h_c$). It is well known that $h_c$ for air is very much smaller than $h_c$ for liquid. Consequently the heat transferred from a solid surface to air is much less than that transferred by the same solid surface to liquid. Rewriting the second equation in terms of $\Delta T/Q$ (°C/watts) we have defined the thermal resistance (R) of the surface at $1/Ah_c$. Thus, $R_{SURFACE}$ for air is high and $R_{SURFACE}$ for liquid is low.

The third equation defines the thermal resistance (R) of various materials in a heat flow path as directly proportional to the length of the heat flow path (L) through the material and inversely proportional to the product of the surface area (A) of the material and the thermal conductivity coefficient ($\sigma$) of the material.

The heat flow distribution chart FIG. 5 is a schematic diagram representive of the several heat flow paths and the theoretical thermal resistances of various parts of the level sensor. The design characteristics of each part of the level sensor are discussed below.

SURFACE RESISTANCE OF THE CAN

It can be seen from the schematic diagram FIG. 5 that the only part of the level sensor which has a thermal resistance which varies in relation to whether the coolant medium is air or liquid and, hence, the only element of the level sensor which provides the capability of distinguishing between air and liquid is the thermal resistance of the can surface ($R_{SURFACE}$). Thus, all design criteria for the entire package are directed toward maximizing the heat flow through the can surface and minimizing the heat flow through other flow paths of the sensor package. As mentioned above, the electrical circuit to which the PTC sensor is connected responds only to the thermal resistance of the entire sensor package and, for that reason, the sensor packaging is designed so that its overall thermal resistance is as closely related as possible to the thermal resistance of the can surface.

Accordingly the sensor element is housed in a housing or can 14 which is intended as the primary heat path to the ambient coolant. Heat flow through the can is maximized while heat flow through other paths, i.e., through the stem, are minimized. Since the thermal resistance of the can surface $R_{SURFACE}$ is inversely proportional to the product of the can surface area (A) and the surface heat transfer coefficient ($h_c$), and since the latter is a constant, the surface area has been maximized by making the can 14 bulbous-shaped. In this manner, the thermal resistance of the can surface is kept as low as possible.

CAN

The can itself has a low thermal resistance because the can has a large area and is made from any convenient metal having a high thermal conductivity. Further the length of the heat flow path is reduced by making the can thin which also helps to keep the mass as low as possible to provide a low time constant, as more fully described below.

STEM

As mentioned above, it is desired to minimize heat flow through the stem or tube portion 40 of the sensor because it detracts from heat transfer through the can. The thermal resistance $R_{STEM}$ of the stem portion is made as large as possible in comparison to the can surface thermal resistance ($R_{SURFACE}$). Referring to the third equation described above, the length of the stem is increased to make the heat flow path as long as possible consistant with vibration requirements. A stem length of about one inch has been found satisfactory. It is preferable to construct the stem of stainless steel which has one of the lowest thermal conductivities of all metals. Further, the surface area of the stem is kept to a minimum by making the stem diameter very small. A diameter of about 0.082 inches has been found satisfactory. The thickness of the stem walls is kept to a minimum to further reduce the mass and the heat conducting area of the sensor.

SOLDER AND ALUMINA

On one side the alumina wafer 10 is soldered 12 to the inside of the can 14 to make a good mechanical contact and, on the other side the alumina wafer is soldered 18 to the sensor pill 20 and lead 16. The alumina wafer has high electrical resistance and electrically isolates the sensor pill 20 from the ambient coolant. Other ceramic isolation may be used. To increase heat flow through the solder 12, 18 and alumina wafer 10 it is desired to keep the thermal resistance of both as low as possible. The surface area of both the alumina and the solder is increased by making them flat and thin which also shortens the heat flow path from sensor to can. It is necessary to insure that a good bond between the solder 12, 14 and alumina wafer 10 is formed throughout to prevent thermal fatigue and for this purpose, the flat surface of the wafer are preferably metallized in any conventional manner. Alumina was selected as the electrical isolator because it has very high thermal conductivity in relation to its cost and isolation properties.

The solder found to be most satisfactory was solder comprising 95 percent tin – 5 percent silver. This solder has melting and solidus temperatures above the 180°C. anomaly temperature of the PTC sensor. Further, this solder does not destroy the metallization of the alumina which would cause air gaps to form in the alumina and impair the heat transfer characteristics of the wafer. A further advantage of tin-silver solder over other solders, such as lead solder, is that a non-corrosive flux rather than an acid flux can be used. Acid flux attacks the PTC material of the sensor element.

The tin/silver solder was found to give improved thermal fatigue resistance. That is, after extensive testing it was found the cyclic expansion and contraction of the materials of the present construction did not produce a break in the solder contacts. The fatigue resistance is also helped by locating the PTC pill, solder and alumina wafer immediately adjacent each other.

WIRE LEADS

The wire leads 16 and 22, as in the case of the stem 40, constitute a heat flow path which must not be permitted to detract from the heat transferred through the surface of the can 14. Therefore, the wire leads 16 and 22 are made from a copper-nickel alloy (Cu55/Ni45)

known as cupron which is selected for its low thermal conductivity and are solderable without acid flux. The wires are made long to increase the length of the heat flow path and are of a small diameter to reduce surface area. The tips of the wires are flattened to reduce the thickness of the solder layers in which they are embedded and to shorten the heat transfer path to the surface of the can. Another advantage of a flattened wire lead is greater mechanical strength for the solder bond which gives a better, longer lasting contact.

The PTC sensor 20 is a sensing element well known to those skilled in the art. A PTC pill having an anomaly temperature of 180°C. was selected in order to have the anomaly temperature (i.e., the electrical switch-over point) as far removed from the ambient temperature upper limit (104°C.) as possible.*

*Given applicants' disclosure, those skilled in the art know that an NTC sensor pill could be used in this invention with obvious modifications.

Another feature of the present invention is its low time constant in the range of about 7 seconds. The time constant is the time needed for the PTC sensor to reach anomaly temperature after the liquid level has receded sufficiently to expose the sensor to air. The time constant is directly proportional to the mass of all exposed parts of the sensor. This requirement conflicts with the previously described requirement to maximize the surface area of the can. Consequently, both factors must be compromised for optimum results.

From the above description it is seen that the level sensor of the present invention is hermetically sealed from the ambient coolant. This feature is necessary because it was found that the ethylene glycol of modern antifreezes, when heated, adversely affects the PTC sensor pill used in prior sensors and any organic materials used in constructing the overall sensor package. In the present construction all organic materials have been eliminated and the PTC pill is physically isolated from the liquid by hermetically sealing the sensor.

Vibration resistance is essential for any internal combustion engine installation. It is achieved here by making the thin stem strong and by keeping the mass of the can to a minimum. It was found that the resonant frequency of the sensor of the present invention was over 500 cycles per second, which is a safe range. Damage resistance is enhanced by making the stem and can strong.

The liquid level sensor is assembled as follows:

The outer package comprising the stem, kovar washer and hex nut are assembled first. The ends of the stainless steel stem 40 are roughened and ultrasonically cleaned. Using silver solder, a kovar washer 36 is soldered 42 to the stem 40. This forms the stem base. The stainless steel stem is then polished and cleaned. Stem 40 is then soldered 42 with 95 percent tin/5 percent silver solder and Eutecsol flux No. 682 to the bushing 44. This forms the end portion of the stem. The excess flux is then cleaned off of the bushing with warm water and swabbed. The washer periphery is tinned with 95 percent tin/5 percent silver solder and Eutecsol flux No. 682. Again, the flux is cleaned from the washer with warm water and a wiper. The stem is then polished with a wire brush.

The inner package comprising the sensor pill, alumina wafer, can, leads, side sleeve and rear insulator washer is next put together. All soldering in the inner package is with 95 percent tin/5 percent silver solder. First, two wire leads 16, 22 are formed for the PTC pill. One end of each lead is then flattened. One lead 22 is soldered 24 to one side of the pill 20. The other lead 16 and alumina wafer 10 is soldered 18 to the other side of the pill. The pill and leads are then cleaned in a solvent such as Cobehn solvent. Both leads are then burnished with emery paper. The insulating sleeves 26, 28 for the leads are cut to the proper length, heated on a hot plate and placed on the leads. The leads are then folded correctly over the PTC pill. Next, a solder wafer 12 is put into the inside of the can into which has already been inserted the kapton sleeve 30 as a side insulator. Next the pill-wafer-leads assembly is then put into the can 14. Holding the can and assembly properly with tweezers, heat is applied to the solder form 12 by placing the can on a stationary soldering iron (130° setting on Variac) and removed when soldered. This operation solders 12 the alumina wafer 10 to the can 14 and solders 18 the PTC pill 20 and lead 16 to the alumina wafer 10. The assembly is again cleaned with Cobehn. The rear insulator 34, a kapton washer, is next inserted, the two leads extending through the central aperture of the washer.

Finally, the entire package is formed by combining the inner and outer package. The periphery of the kovar washer 36 on the end of the outer package is soldered 38 to the can 14 with tin-silver solder while holding the tip of the can immersed in water. The inner hole of the bushing 44 is then covered with RTV-108 sealant 50. Automotive male connectors 46, 48 are soldered to the ends of each lead with tin/silver solder. The male connectors are placed in an external holder. Six milligrams of epoxy 52 with 0.6 milligrams of catalysts (10 percent) are mixed thoroughly and poured into the bushing 44. The holder containing the male connectors is connected to a clamp and the unit is placed in an oven at about 70°C. for ten to 15 minutes. The holder is then removed from the bushing. A final coat of epoxy is put on with a fine applicator tube using the same epoxy formula as used in the earlier step described above.

We claim:

1. A liquid level sensor adapted for connection to an electrical circuit comprising a bulbous-shaped housing having one open end and having therein an electrical isolator soldered on one side to an inside surface of the housing, a temperature sensor pill having a low electrical resistance mode and a high electrical resistance mode, the switch-over between the two modes occuring at temperatures above a predetermined anomaly temperature, a pair of leads soldered at one end to opposite sides of the sensor pill, one side of the sensor pill being soldered to the other side of the electrical isolator away from the side which is adhered to the inside surface of the housing, sandwiching the end of one lead therebetween, and cover means hermetically sealing the open end of the housing and having the other ends of the leads extending therethrough and adapted for connection to the circuit whereby when the level sensor is immersed in one ambient it is cooled thereby and operates in one resistance mode and when the level sensor is exposed to another ambient it self-heats to temperatures above the anomaly temperature and operates in the other resistance mode.

2. The level sensor of claim 1 further comprising a sleeve within the housing surrounding the electrical isolator, sensor pill and leads for insulating the sides of the housing.

3. The level sensor of claim 2 further comprising a rear insulator material between the cover means and the sensor pill.

4. The level sensor of claim 3 wherein the cover means for hermetically sealing the open end of the housing comprises
a washer portion soldered to and covering the open end of the housing and having a central aperture,
a bushing portion having a central aperture and an open end,
a hollow stem portion sealingly connecting the washer and bushing portions,
an insulating compound sealingly closing the open end of the bushing portion,
the leads extending through the central apertures, and the hollow stem and into the insulating compound and being adapted for connection to the circuit.

5. The level sensor of claim 4 further comprising a sealant material plugging the central aperture of the bushing.

6. The level sensor of claim 5 further comprising connector pins secured to the ends of the leads for connection to the circuit.

7. The level sensor of claim 1 wherein the bulbous-shaped housing is a metal can.

8. The level sensor of claim 1 wherein the electrical isolator is a thin alumina wafer and the solder comprises 95 percent Tin and 5 percent Silver.

9. The level sensor of claim 8 wherein the solder layer is thin and wide.

10. The level sensor of claim 1 wherein the temperature sensor pill is a sensor having a positive temperature coefficient.

11. The level sensor of claim 1 wherein the leads are made from a copper-nickel alloy and the end of the lead sandwiched between the sensor pill and the isolator is flattened.

12. The level sensor of claim 11 wherein the leads are each covered with an insulating sleeve.

13. The level sensor of claim 3 wherein the said sleeve and the said rear insulator material are made of kapton material.

14. The level sensor of claim 4 wherein the stem portion in relation to the housing is a long, thin, hollow, stainless steel tube of small diameter.

15. The level sensor of claim 4 wherein the washer portion is made of kovar material.

16. The level sensor of claim 4 wherein the sealing connections between the stem and washer portions and between the stem and bushing portions are a silver solder.

17. The level sensor of claim 4 wherein the bushing portion is a bushing adapted for mounting the level sensor to a structure containing the ambient.

18. The level sensor of claim 4 having a time constant of about 7 seconds.

19. A level sensor for the liquid coolant system of an internal combustion engine comprising
a bulbous-shaped can having an open end,
an electrically isolating wafer soldered to an inside surface of the can,
a PTC pill having a predetermined anomaly temperature,
a pair of insulated wire leads one end of each of which is soldered to opposite sides of the pill,
the pill being soldered to a side of the wafer away from the side which is soldered to the inside surface of the can and sandwiching one end of one lead therebetween,
a side insulating sleeve within the can,
a centrally apertured rear insulating washer adjacent the open end of the can,
a metal washer the periphery of which is soldered to the open end of the can sealingly closing said open end,
a hollow, stainless steel stem sealingly secured to the metal washer,
a centrally apertured, bushing having a base portion sealingly secured to the stem and an outer end portion,
a mass of insulating material sealingly closing the portion of the bushing,
the leads passing from the can through the central apertures of the washers, the hollow stem, the central aperture of the bushing and the insulating mass, and being adapted for connection to an electrical circuit,
the sensor having a high heat flow path and a low heat flow path to the ambient system,
the can, wafer, PTC pill, and conjoining solder defining the high heat flow path,
the sleeve, rear insulating washer, leads, metal washer, stem, bushing and insulating mass defining the low heat flow path,
whereby when the sensor is immersed in a liquid coolant there is high heat dissipation through the high heat flow path and the PTC pill is cooled, operating in a low resistance mode, and when the sensor is exposed to air there is low heat dissipation through the high heat flow path and the PTC pill self-heats above the anomaly temperature, operating in the high resistance mode.

* * * * *